United States Patent
Fukumoto

[19]

[11] Patent Number: 6,112,870
[45] Date of Patent: Sep. 5, 2000

[54] CLUTCH PRESSURE CONTROL APPARATUS AND METHOD FOR A WORKING VEHICLE

[75] Inventor: Toshiya Fukumoto, Sakai, Japan

[73] Assignee: Kubota Corporation, Japan

[21] Appl. No.: 09/154,334

[22] Filed: Sep. 16, 1998

[30] Foreign Application Priority Data

Sep. 19, 1997 [JP] Japan .................................. 9-254443

[51] Int. Cl.[7] .................................................. B60K 41/02
[52] U.S. Cl. ..................... 192/3.58; 192/3.62; 192/85 R; 192/103 C
[58] Field of Search ................................. 192/3.58, 3.62, 192/52.4, 85 R, 103 C, 109 F

[56] References Cited

U.S. PATENT DOCUMENTS

| | | | |
|---|---|---|---|
| 4,343,387 | 8/1982 | Hofbauer | 192/103 C X |
| 4,924,983 | 5/1990 | Katayama et al. | 192/52.4 |
| 4,979,599 | 12/1990 | Nishida | 192/3.58 X |
| 5,450,768 | 9/1995 | Bulgrien et al. | 74/336 R |
| 5,806,640 | 9/1998 | Kale | 192/85 R X |

FOREIGN PATENT DOCUMENTS

| | | |
|---|---|---|
| 3-48063 | 3/1991 | Japan . |
| 6-59797(B2) | 8/1994 | Japan . |
| 6-59798(B2) | 8/1994 | Japan . |

*Primary Examiner*—Richard M. Lorence
*Attorney, Agent, or Firm*—Webb Ziesenheim Logsdon Orkin & Hanson, P.C.

[57] ABSTRACT

In carrying out a shifting operation in a working vehicle such as a tractor, an actual acceleration of the working vehicle is measured, and a feedback control of a control hydraulic pressure applied to a hydraulic clutch is performed to fix a jerk which is a differentiation of the measured acceleration with respect to time. Thereafter, a feedback control is performed to fix the acceleration. A theoretical running speed is derived from a rotating speed of the engine and a speed position detected. When an actual speed of the working vehicle becomes equal to the theoretical running speed, The control hydraulic pressure applied to the hydraulic clutch is increased to a maximum.

17 Claims, 12 Drawing Sheets

Fig. 7(A)
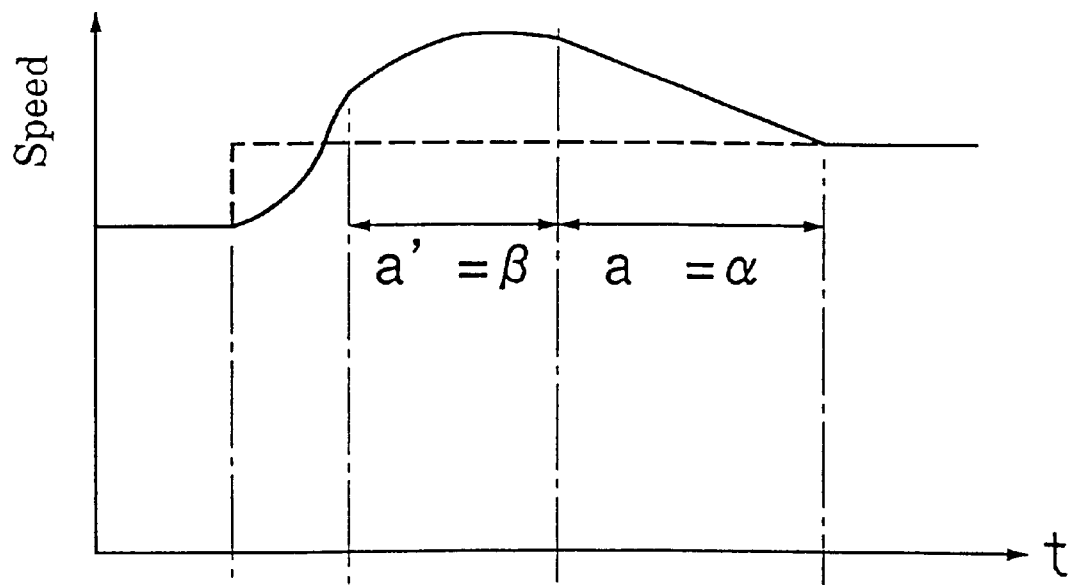
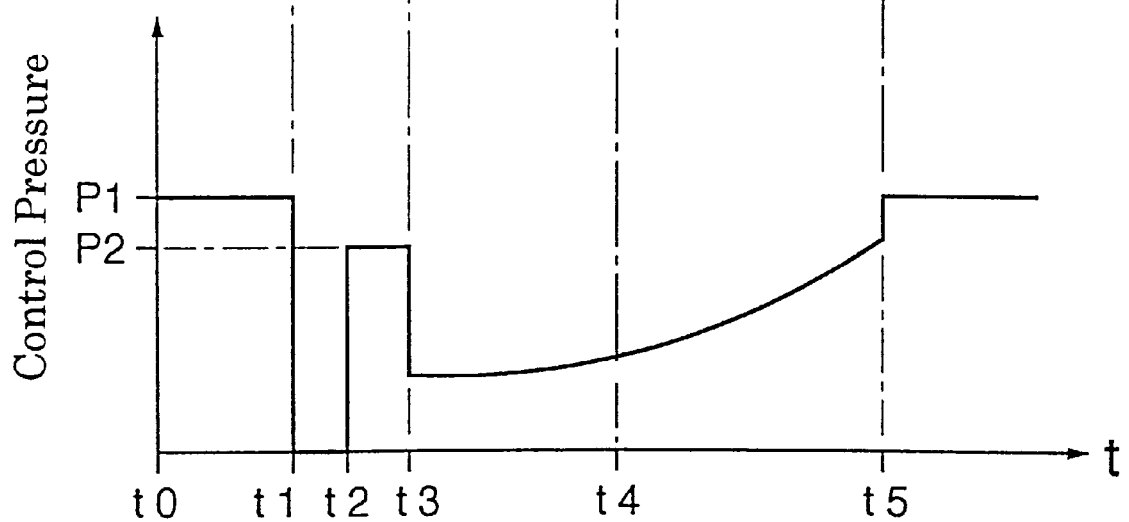
Fig. 7 (B)

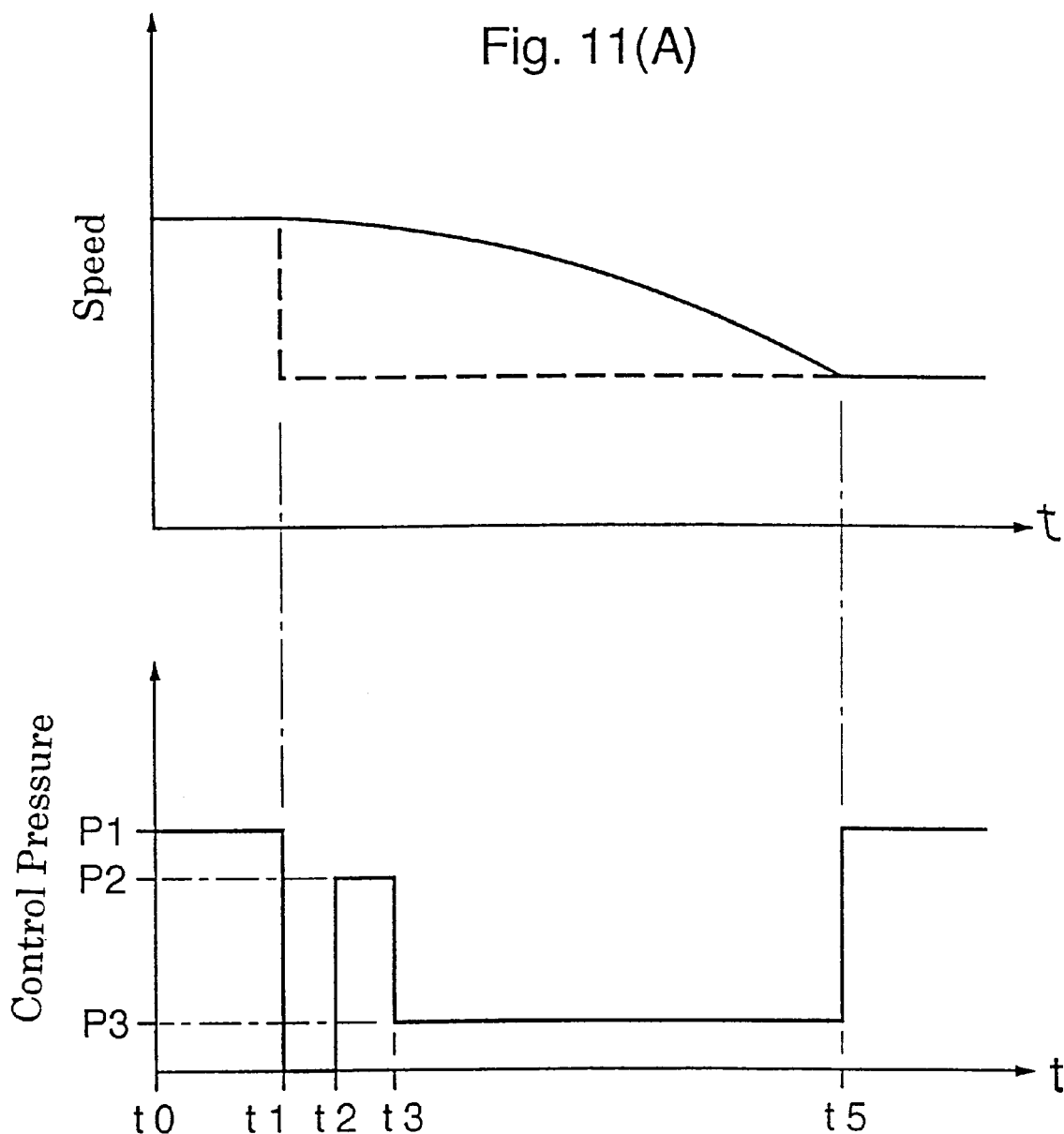

CLUTCH PRESSURE CONTROL APPARATUS AND METHOD FOR A WORKING VEHICLE

BACKGROUND OF THE INVENTION

1. Field of the Invention

This invention relates to an apparatus for controlling hydraulic pressure which operates a clutch used in changing speed of a working vehicle and to a clutch pressure control method.

2. Description of the Related Art

A conventional working vehicle is shown in Patent Laying-Open Publication H6-11023, for example. In this conventional vehicle, one of a plurality of predetermined pressure curves is selected based on such factors as rotating speed of the engine, a change speed shift position and rolling of the wheels. When a hydraulic clutch (change clutch) is engaged, the pressure of the clutch is controlled to increase according to the pressure curve selected.

Where, as in the conventional working vehicle, the pressure is increased according to the characteristic selected when the hydraulic clutch is engaged, one of predetermined pressure increase characteristics is selected. However, this requires numerous pressure characteristics must be set in order to engage the hydraulic clutch smoothly while coping with various factors. Such a working vehicle is troublesome to manufacture, and has room for improvement.

Besides, where the pressure of the hydraulic clutch is controlled according to one of the pressure curves stored, the clutch pressure could be increased gradually according to the pressure curve, for example, even after the working vehicle reaches a desired speed. In such an event, an unduly long time is taken before completion of clutch connection, i.e. clutch change speed. That is, the clutch pressure is controlled regardless of a state of the working vehicle. Such clutch pressure control cannot be said optimal. There is room for improvement in this respect also.

A shock of change speed occurs when the hydraulic clutch is engaged. Due to mechanical variations of the hydraulic clutch or mechanical variations of an electromagnetic valve or the like for controlling the pressure of the hydraulic clutch, even a proper control may fail to increase the pressure of the hydraulic clutch according to a selected one of the predetermined characteristics. In this sense also, there is room for improvement.

SUMMARY OF THE INVENTION

The above problems are solved, according to this invention, by a working vehicle having an engine, a traveling device, and a transmission disposed between the engine and the traveling device, comprising a clutch disposed between said engine and said traveling device, said clutch being switchable among a state for breaking drive transmission from said engine to said traveling device, a half-clutch state, and a state for making said drive transmission, and an actuator for controlling said clutch. A ground speed of the working vehicle is measured, and a measured acceleration is derived from the speed of the working vehicle. Then, a feedback control of the actuator is performed to bring the measured acceleration into agreement with a predetermined acceleration characteristic.

It is also possible to compute a theoretical running speed, which is a desired running speed, from a rotating speed of the engine and a target speed position for a shifting operation, and perform a feedback control of the actuator to bring the measured speed close to the theoretical running speed.

In both of the control modes noted above, the hydraulic clutch may be controlled based on acceleration of the working vehicle, without requiring numerous pressure curves to be stored for controlling the hydraulic clutch. In the first control mode in particular, an optimal clutch control may be performed based on the acceleration of the working vehicle, in a way to avoid shocks and the like.

Other features and advantages of this invention will be apparent from the following description of the embodiment of this invention to be taken with reference to the drawings.

BRIEF DESCRIPTION OF THE DRAWINGS

FIG. 7(A) is a view showing a control relating to the feedback control of the hydraulic clutch performed when, with the working vehicle in rapid acceleration, a shift is made to a higher speed position;

FIG. 7(B) is a view showing a control hydraulic pressure applied to the hydraulic clutch as a result of the control shown in FIG. 7(A);

FIG. 11(A) is a view showing a control relating to the feedback control of the hydraulic clutch performed when, with the working vehicle in non-rapid deceleration, a shift is made to a lower speed position;

FIG. 11(B) is a view showing a control hydraulic pressure applied to the hydraulic clutch as a result of the control shown in FIG. 11(A)

DETAILED DESCRIPTION OF THE PREFERRED EMBODIMENT

An embodiment of this invention will be described hereinafter with reference to the drawings.

Figure 1:
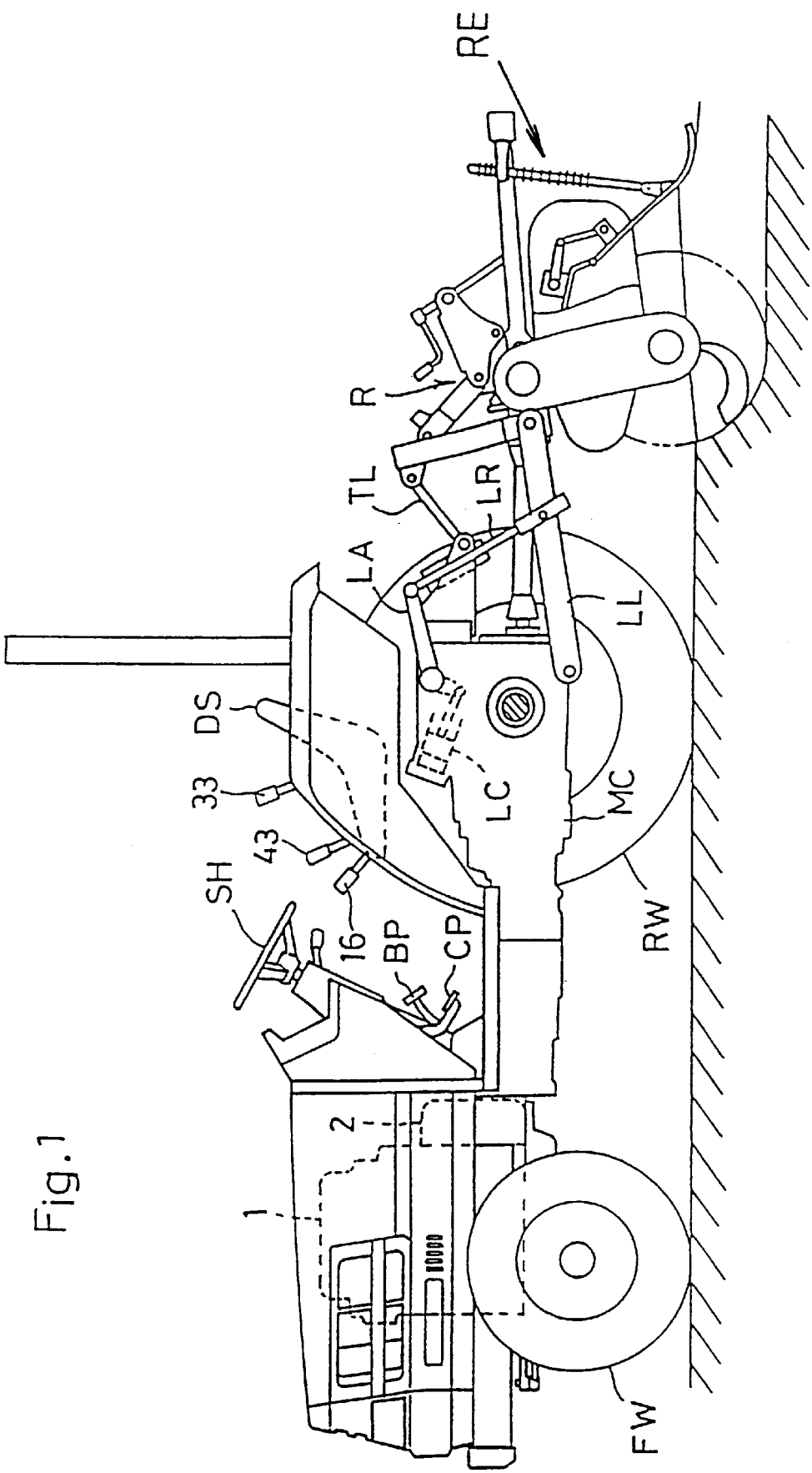
FIG. 1 is a side elevation of a working vehicle according to this invention.

As shown in FIG. 1, an agricultural tractor, which is one example of working vehicles, includes an engine 1 mounted in a front position of a tractor body having dirigible front drive wheels FW and rear drive wheels RW. The tractor has a transmission system for transmitting power from the engine 1 to a transmission case MC through a main clutch 2 mounted in a main clutch housing. A steering wheel SH and a driver's seat DS are arranged in a central region of the vehicle body. Further, the agricultural tractor includes a pair of right and left lift arms LA vertically pivotable by a lift cylinder LC acting as a lift mechanism disposed in an upper rear position of the transmission case MC.

This tractor has a rotary plow RE is coupled to a rear end of the tractor body through a three-point link mechanism including a top link TL and a pair of right and left lower links LL. The lower links LL are suspended from the right and left lift arms LA through lift rods LR. Thus, the lift arms LA are driven to raise and lower the rotary plow RE.

Laterally of the driver's seat DS are a position lever (not shown) for setting a height of the rotary plow relative to the tractor body, a main shift lever 33 for shifting a change speed gearing mounted in the transmission case MC, a backward and forward drive changeover lever 16 and an auxiliary shift lever 43. A brake pedal BP is disposed at the right side of a footrest, and a main clutch pedal CP disposed at the left side of the foot rest. A brake switch 65 (FIG. 5) is provided to detect displacement of the brake pedal BP.

Figure 2:
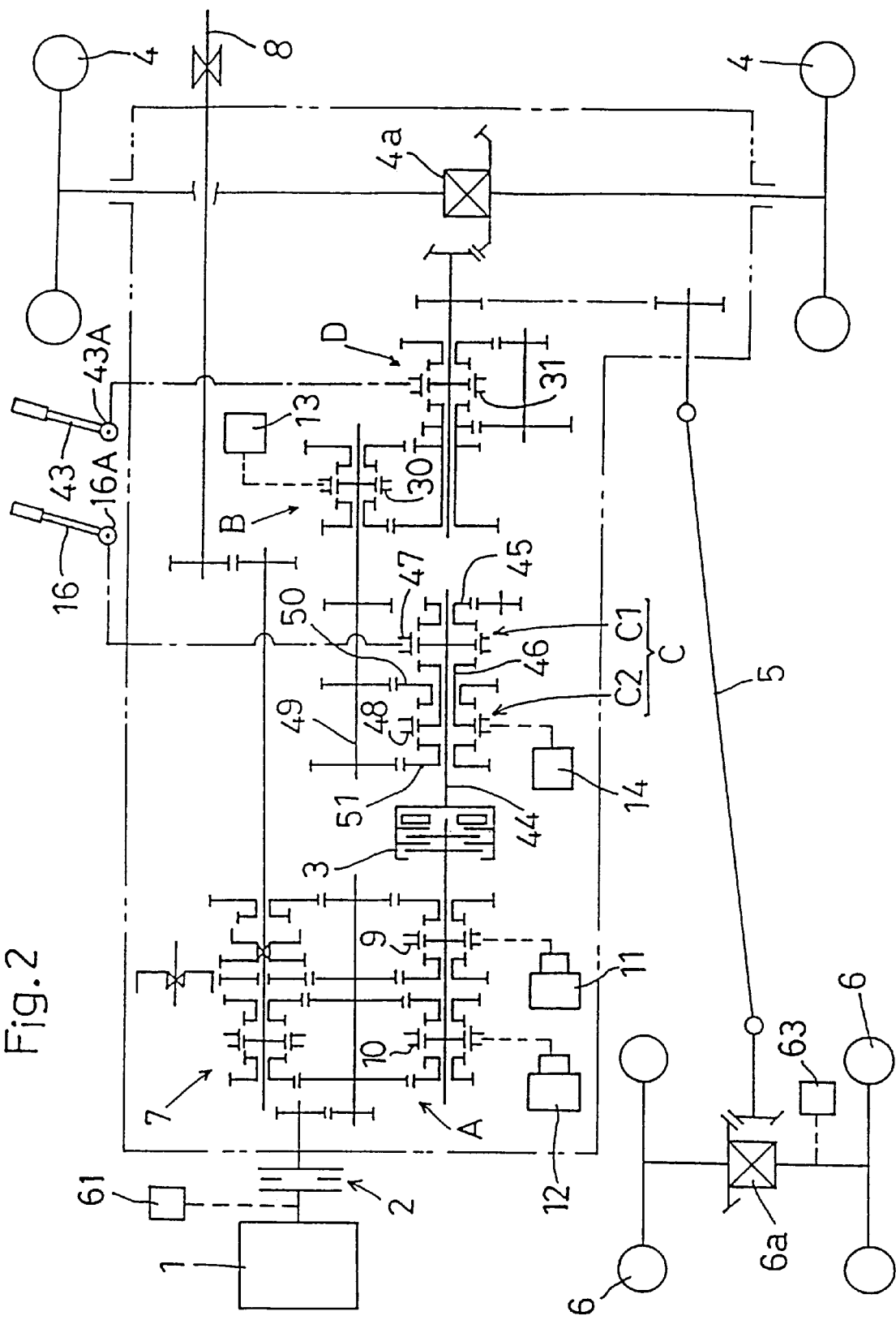
FIG. 2 is an explanatory view of paths through which drive is transmitted from an engine to front wheels and rear wheels of the working vehicle shown in FIG. 1.

FIG. 2 shows the transmission system of the agricultural tractor. The power of engine 1 is transmitted to the rear wheels 4 through the main clutch 2, a first main change speed device A, a multi-disk hydraulic clutch 3 for allowing propelling speed changes, a first auxiliary change speed device C, a second main change speed device B, a second auxiliary change speed device D and a rear differential 4a. Power branched off immediately upstream of the rear differential 4a is transmitted to the front wheels 6 through a transmission shaft 5 and a front differential 6a. The power of engine 1 is transmitted also to a PTO shaft 8 through a PTO change speed device 7. In one embodiment, front wheels FW and rear wheels RW, as well as their support shafts, make up a traveling device. However, a traveling device can be any device or combination of devices that enables movement.

The first main change speed device A is a synchromesh change speed gearing having two shifters 9 and 10 to provide four speeds. The second main change speed device B is a synchromesh change speed gearing having one shifter 30 to provide two speeds. Thus, the first and second main change speed devices B in combination provide eight speeds. The shifters 9 and 10 of the first main change speed device A are slidable by a first and a second hydraulic cylinders 11 and 12, respectively. The shifter 30 of the second main change speed device B is slidable by a third hydraulic cylinder 13.

The second auxiliary change speed device D is a change speed gearing having one shifter 31 to provide two speeds. The shifter 31 is slidable directly by an auxiliary shift lever 43. Thus, the first and second main change speed devices and the second auxiliary change speed device D in combination provide a maximum of 16 speeds. As shown in FIG. 2, a switch 43A is provided at the base of the auxiliary shift lever 43 to act as a speed position sensor for detecting shift positions of the auxiliary shift lever 43. Output of the switch 43A acting as the speed position sensor is transmitted to a controller 42 (FIG. 4).

Figure 4:
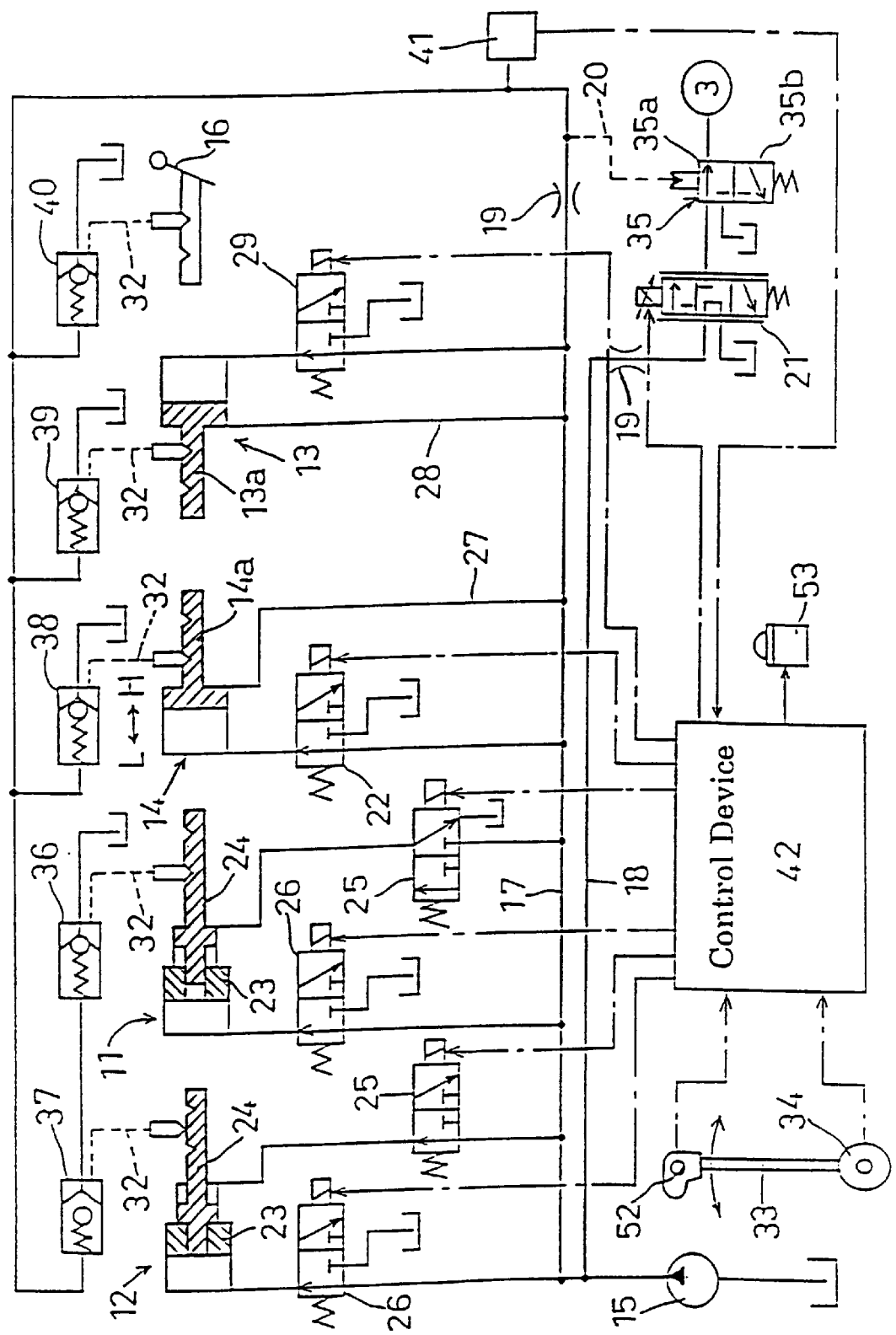
FIG. 4 is an explanatory view of a hydraulic system of the working vehicle shown in FIG. 1.

Numeral 61 in FIG. 2 denotes a tachometer acting as a revolution speed sensor for measuring a rotating speed of the engine 1 and communicating it to the controller 42 (FIG. 4). In addition, a speed sensor 63 is provided for the front wheels 6 for measuring an actual ground speed of the working vehicle.

As noted above, the agricultural tractor in this embodiment basically can provide 16 speeds. However, it is desired to switch to a shift position for a transmission ratio slightly different from a current transmission ratio when the tractor is subjected to load variations occurring with variations in ground conditions, for example. When the tractor returns to a former load condition, the previous shift position is to be established again. To meet such a demand, the tractor in this embodiment includes the first auxiliary change speed device C for achieving a transmission ratio only slightly different from a current shift position.

The first auxiliary change speed device C will be described next.

Figure 3:
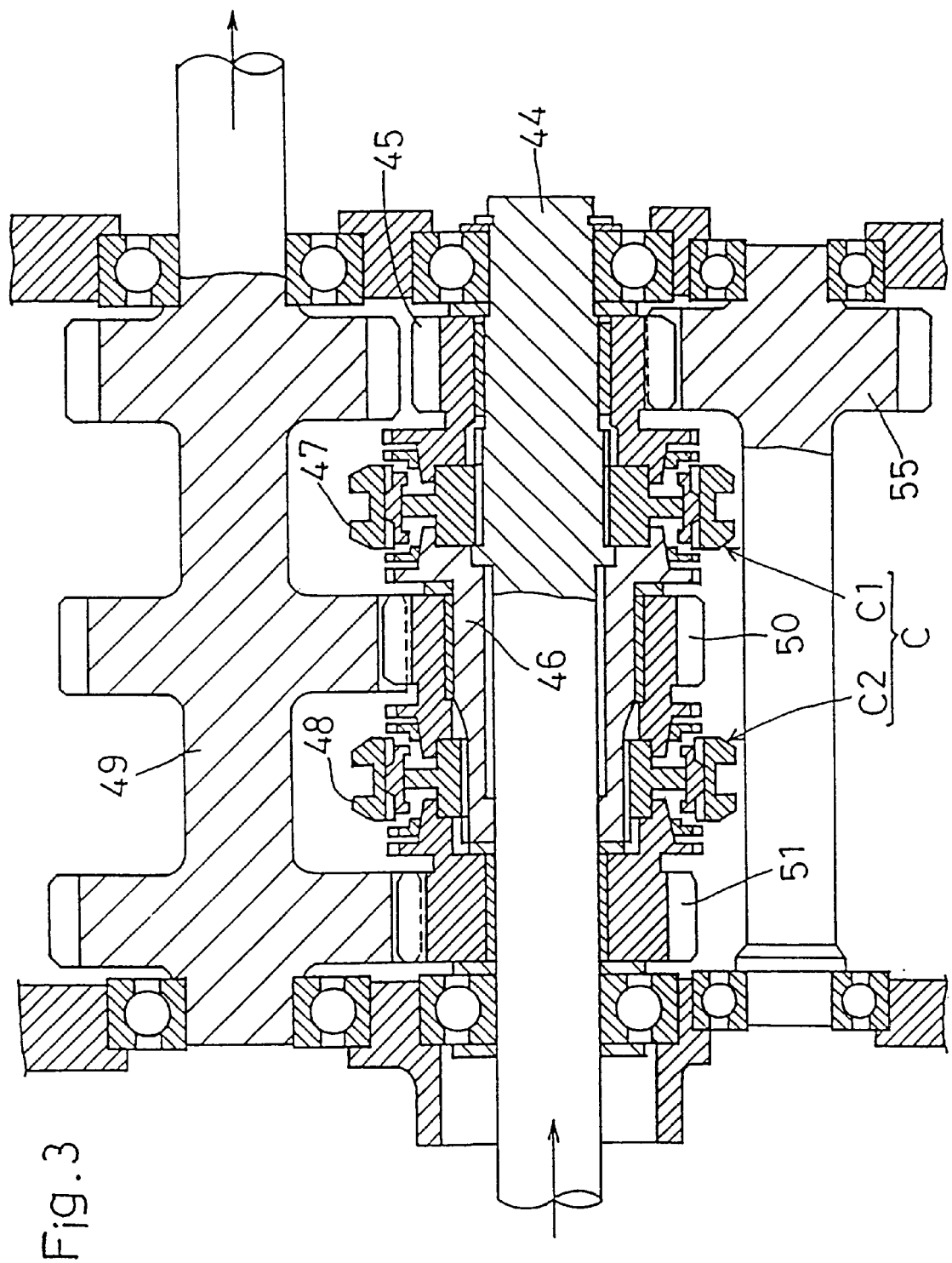
FIG. 3 is a sectional view of an auxiliary change speed device.

As shown in FIGS. 2 and 3, the first auxiliary change speed device C includes a backward and forward drive changer C1 of the synchromesh type having a shifter 47, and a speed changer C2 of the synchromesh type having a shifter 48 to provide two speeds.

The backward and forward drive changer C1 has a reverse gear 45 and a forward drive sleeve shaft 46 relatively rotatably mounted on a transmission shaft 44 extending from the hydraulic clutch 3. When the shifter 47 mounted on the transmission shaft 44 is slid rightward in FIG. 3 into mesh with the reverse gear 45, the drive of transmission shaft 44 is transmitted from the reverse gear 45 through an intermediate gear 55 to a transmission shaft 49 extending to the second main change speed device B, in backward rotation and without being transmitted through the speed changer C2.

Conversely, when the shifter 47 is slid leftward in FIG. 3 into mesh with the forward drive sleeve shaft 46, the drive of transmission shaft 44 is transmitted in forward rotation to the forward drive sleeve shaft 46. The shifter 47 is slidable directly by the backward and forward drive changeover lever 16. As shown in FIG. 2, a switch 16A is provided at the base of the backward and forward drive changeover lever 16 to act as a speed position sensor. Speed position sensors detect target speed position. For example, if an operator wishes to switch from speed position four to speed position five, speed position five is the target speed position. Output of the switch 16A is transmitted to the controller 42.

As shown in FIGS. 2 and 3, the speed changer C2 has a high-speed gear 50 relatively rotatably mounted on the forward drive sleeve shaft 46, and a low-speed gear 51 relatively rotatably mounted on the transmission shaft 44. When the shifter 48 mounted on the forward drive sleeve shaft 46 is slid rightward in FIG. 3 into mesh with the high-speed gear 50, the drive of forward drive sleeve shaft 46 is transmitted in high-speed forward rotation to the transmission shaft 49. Conversely, when the shifter 48 is slid leftward in FIG. 3 into mesh with the low-speed gear 51, the drive of forward drive sleeve shaft 46 is transmitted in low-speed forward rotation to the transmission shaft 49. The shifter 48 is slidable by a fourth hydraulic cylinder 14.

The high-speed gear 50 and low-speed gear 51 of the speed changer C2 have a difference in transmission ratio smaller than a difference in transmission ratio between shift positions of the first and second main change speed devices A and B (shift lever 33) described hereinafter.

The fourth hydraulic cylinder 14 of the speed changer C2 will be described next.

As shown in FIG. 4, an electromagnetic control valve 22 is provided to supply and drain hydraulic oil to/from an oil chamber, at the left side in FIG. 4, of the fourth hydraulic cylinder 14. An oil line 27 branched from an oil line 17 described later is connected to an oil chamber, at the right side in FIG. 4, of the fourth hydraulic cylinder 14 to constantly supply hydraulic oil thereto. The electromagnetic control valve 22 is the three port type having an oil input port, an oil output port and an oil drain port, and is operable to two positions, i.e. a supply position for supplying the hydraulic oil and a drain position for draining the hydraulic oil. The electromagnetic control valve 22 is biased to the supply position by a spring.

With the above construction, when the electromagnetic control valve 22 is operated to the supply position, a piston 14a moves rightward in FIG. 4, due to a difference in pressure receiving area of piston 14a. In this state, the shifter 48 meshes with the high-speed gear 50 of speed changer C2. Next, when the electromagnetic control valve 22 is operated to the drain position, the piston 14a is moved leftward in FIG. 4 by the hydraulic oil supplied from the oil line 27. In this state, the shifter 48 meshes with the low-speed gear 51 of speed changer C2.

The first and second hydraulic cylinders 11 and 12 of the first main change speed devices A will be described next.

As shown in FIG. 4, each of the first and second hydraulic cylinders 11 and 12 has a large-diameter cylinder portion and a small-diameter cylinder for slidably receiving a large-diameter piston 23 and a small-diameter piston 24, respectively. The small-diameter piston 24 is slidably inserted into a bore formed in the large-diameter piston 23.

An electromagnetic control valve 25 is provided to supply and drain hydraulic oil to/from the right side in FIG. 4 of the small-diameter piston 24. An electromagnetic control valve 26 is provided to supply and drain hydraulic oil to/from the left side in FIG. 4 of the large-diameter piston 23. The electromagnetic control valves 25 and 26 are the three port type having an oil input port, an oil output port and an oil drain port, and are operable to two positions, i.e. a supply position for supplying the hydraulic oil to the first or second hydraulic cylinder 11 or 12 and a drain position for draining the hydraulic oil therefrom. Each electromagnetic control valve 25 or 26 is biased to the supply position by a spring.

With the above construction, when the electromagnetic control valves 25 and 26 are operated to the supply position, as illustrated with the second hydraulic cylinder 12 in FIG. 4, the large-diameter piston 23 and small-diameter piston 24 move rightward in FIG. 4, while pushing against each other, since the large-diameter piston 23 has a larger pressure receiving area than the small-diameter piston 24. The large-diameter piston 23 and small-diameter piston 24 are stopped where the large-diameter piston 23 contacts a shoulder between the large-diameter and small-diameter cylinder portions. This state corresponds to a neutral stop position of shifter 9 or 10 shown in FIG. 2.

Next, when the electromagnetic control valve 25 is operated to the drain position, with the electromagnetic control valve 26 remaining in the supply position, as illustrated with the first hydraulic cylinder 11 in FIG. 4, the small-diameter piston 24 is moves rightward in FIG. 4, leaving the large-diameter piston 23. In this state, the shifter 9 or 10 shown in FIG. 2 is slid lightward into mesh with a transmission gear. Conversely, when the electromagnetic control valve 26 is operated to the drain position, with the electromagnetic control valve 25 remaining in the supply position, the large-diameter piston 23 and small-diameter piston 24 move together leftward in FIG. 4. In this state, the shifter 9 or 10 shown in FIG. 2 is slid leftward into mesh with a different transmission gear.

The third hydraulic cylinder 13 of the second main change speed device B will be described next.

As shown in FIG. 4, and as in the case of the fourth hydraulic cylinder 14, an electromagnetic control valve 29 is provided to supply and drain hydraulic oil to/from an oil chamber, at the right side in FIG. 4, of the third hydraulic cylinder 13. An oil line 28 branched from the oil line 17 described later is connected to an oil chamber, at the left side in FIG. 4, of the third hydraulic cylinder 13 to constantly supply hydraulic oil thereto. The electromagnetic control valve 29 is the three port type having an oil input port, an oil output port and an oil drain port, and is operable to two positions, i.e. a supply position for supplying the hydraulic oil and a drain position for draining the hydraulic oil. The electromagnetic control valve 29 is biased to the supply position by a spring.

With the above construction, when the electromagnetic control valve 29 is operated to the supply position, a piston 13a moves leftward in FIG. 4, due to a difference in pressure receiving area of piston 13a. This state corresponds to a low-speed position of the second main change speed device B. Next, when the electromagnetic control valve 29 is operated to the drain position, the piston 13a is moved rightward in FIG. 4 by the hydraulic oil supplied from the oil line 28. This state corresponds to a high-speed position of the second main change speed device B.

A hydraulic circuit for operating the first, second, third and fourth hydraulic cylinders 11, 12, 13 and 14 and the hydraulic clutch 3 will be described next.

As shown in FIG. 4, oil lines 17 and 18 extend parallel to each other from a pump 15. The oil line 18 has a pressure control valve 21 and a control valve 35 of the electromagnetic proportional type connected in series. The hydraulic clutch 3 is connected downstream of the control valve 35. That is, the pressure control valve 21 acts as an actuator for steplessly controlling the hydraulic clutch 3. This actuator controls the hydraulic clutch 3 to switch between a state to make and a state to break drive transmission from the engine 1 to the front wheels 6 and rear wheels 4, with a half-clutch state therebetween.

The control valve 35 is the pilot-operated type switchable between a supply position 35a for supplying hydraulic oil to the hydraulic clutch 3 to engage the clutch 3, and a drain position 35b for draining the hydraulic oil from the hydraulic clutch 3 to disengage the clutch 3. The control valve 35 is biased to the drain position 35b by a spring. A pilot oil line 20 is branched from the oil line 17 downstream of a constriction 19 and connected to the control valve 35.

The above-mentioned electromagnetic control valves 22, 25, 26 and 29 are connected to the oil line 17 upstream of the constriction 19. Switch valves 36, 37, 38, 39 and 40 each biased to a closed position are connected to the oil line 17 downstream of the constriction 19. The first to fourth hydraulic cylinders 11–14 have piston rods defining recesses in positions corresponding to shift positions, and ridges formed between the recesses and corresponding to neutral positions. Interlock mechanisms 32 are provided to open the switch valves 36–39 between the shift positions.

Similar recesses and ridges are formed on a shift rod for sliding the shifter 47 in the backward and forward drive changer C1 of the first auxiliary change speed device C. An interlock mechanism 32 is provided to open the switch valve 40 between a forward drive position and a backward drive position.

The shift lever 33 is manually operable by the driver, and has a first to eighth speed positions. A potentiometer 34 acts as a speed position sensor for detecting which target speed position the shift lever is switched to, otherwise referred to as a shift position of the shift lever 33. The target speed is the desired speed, as previously discussed. For example, if shifting from speed position four to speed position five, speed position five is the target speed. When a shift position is detected, the potentiometer transmits a signal to the controller 42. Based on operation of the shift lever 33, the controller 42 controls the electromagnetic control valves 25, 26 and 29. The shift lever 33 has a button type control switch 52 disposed on a grip thereof. Based on operation of the control switch 52, the controller 42 controls the electromagnetic control valve 22.

A pressure sensor 41 is disposed downstream of the constriction of oil line 17 for detecting a pilot pressure of the pilot oil line 20. The pressure sensor 41 transmits a signal to the controller 42.

Operation of the shift lever 33 to shift the first and second main change speed devices A and B will be described next.

In FIG. 4, the shift lever 33 is in the first speed position, the first hydraulic cylinder 11 is in the position corresponding to the first speed position of the fist main change speed device A, the second hydraulic cylinder 12 is in the neutral position, the third hydraulic cylinder 13 is at the position corresponding to the low-speed position of the second main change speed device B, and the backward and forward drive changeover lever 16 is in a first forward speed position. In this state, the control valve 35 is operated to the supply position 35a by the pilot pressure of pilot oil line 20 to engage the hydraulic clutch 3.

When, in this first forward speed state, the shift lever 33 is operated to the second speed position, for example, the electromagnetic control valve 25 of the first hydraulic cylinder 11 is operated from the drain position to the supply position, and the electromagnetic control valve 26 of the first hydraulic cylinder 11 is operated from the supply position to the drain position. As a result, the large-diameter piston 23 and small-diameter piston 24 of the first hydraulic cylinder 11 begin to move leftward from the first speed position shown in FIG. 4, to slide the shifter 9.

With this movement of large-diameter piston 23 and small-diameter piston 24 of the first hydraulic cylinder 11, the switch valve 36 is opened by the interlock mechanism 32 (the switch valve 37 being already opened since the second hydraulic cylinder 12 is in the neutral position). As a result, the pilot pressure of pilot oil line 20 lowers, and the control valve 35 is operated from the supply position 35a to the drain position 35b by the biasing force of the spring, to disengage the hydraulic clutch 3.

Next, when the sliding of shifter 9 by the first hydraulic cylinder 11 is completed to set the first main change speed device A to the second speed position, the switch valve 36 is closed by the interlock mechanism 32. The pilot pressure of pilot oil line 20 rises again to operate the control valve 35 from the drain position 35[i ]bto the supply position 35a. In response to the pressure sensor 41 detecting the lowering and rising of the pilot pressure of pilot oil line 20, the controller 42 operates the pressure control valve 21. The hydraulic pressure supplied to the hydraulic clutch 3 is controlled by a control method described hereinafter.

When the shift lever 33 is operated from the second speed position to the third speed position or vice versa, the first main change speed device A is shifted by the first and second hydraulic cylinders 11 and 12 as in the above shifting operation. When the shift lever 33 is operated from the third speed position to the fourth speed position or vice versa, the first main change speed device A is shifted by the second hydraulic cylinder 12.

When the shift lever 33 is operated from the fourth speed position to the fifth speed position or vice versa, the first and second main change speed devices A and B are shifted by the first, second and third hydraulic cylinders 11, 12 and 13. When the shift lever 33 is operated from the fifth speed position to the sixth speed position or vice versa, the first main change speed device A is shifted by the first hydraulic cylinder 11. When the shift lever 33 is operated from the sixth speed position to the seventh speed position or vice versa, the first main change speed device A is shifted by the first and second hydraulic cylinders 11 and 12. When the shift lever 33 is operated from the seventh speed position to the eighth speed position or vice versa, the first main change speed device A is shifted by the second hydraulic cylinder 12.

When the backward and forward drive changeover lever 16 is operated from the forward drive position to the backward drive position or vice versa, the switch valve 40 is operated by the interlock mechanism 32, and the control valve 35 automatically disengages the hydraulic clutch 3, and engages the clutch 3 by the method described hereinafter.

Operation of the control switch 52 to shift the speed changer C2 of the first auxiliary change speed device C will be described next.

In a normal state of the speed changer C2 of the first auxiliary change speed device C, the electromagnetic control valve 22 is placed in the supply position by the biasing force of the spring, the piston 14a of the fourth hydraulic cylinder 14 lies rightward in FIG. 4, and the shifter 48 of speed changer C2 is meshed with the high-speed gear 50.

When, in this state, the control switch 52 of shift lever 33 shown in FIG. 4 is pressed once, the controller 42 operates the electromagnetic control valve 22 from the supply position to the drain position. As a result, the piston 14a of the fourth hydraulic cylinder 14 begins to move leftward in FIG. 4 by the hydraulic oil supplied from the oil line 27. The switch valve 38 is opened by the interlock mechanism 32. The control valve 35 is operated to the drain position 35b to disengage the hydraulic clutch 3.

Next, when the fourth hydraulic cylinder 14 causes the shifter 48 to mesh with the low-speed gear 51, the interlock mechanism 32 closes the switch valve 38. Next, as particularly described hereinafter, the controller 42 operates the pressure control valve 21 to engage the hydraulic clutch 3. At this time, an indicator lamp 53 is lit.

The high-speed gear 50 and low-speed gear 51 of the speed changer C2 have a difference in transmission ratio smaller than a difference in transmission ratio between shift positions of the first and second main change speed devices A and B (shift lever 33). Consequently, when, with the shift lever 33 operated to the second speed position, for example, the control switch 52 is pressed to mesh the shifter 48 with the low-speed gear 51 of speed changer C2 as described above, drive is transmitted at a transmission ratio intermediate between the second speed position and first speed position.

Next, when the control switch 52 of shift lever 33 is pressed again in the above state, the controller 42 operates the electromagnetic control valve 22 from the drain position to the supply position to move the shifter 48 of speed changer C2 out of mesh with the low-speed gear 51 into mesh with the high-speed gear 50. At this time also, the hydraulic clutch 3 is automatically disengaged by the switch valve 38 and control valve 35. As described in detail hereinafter, the controller 42 operates the pressure control valve 21 to engage the hydraulic clutch 3.

Description is made herein of a shifting operation of the shift lever 33, and an operation of the control switch 52 to establish a shift position providing a transmission ratio slightly different from a current shift position. The transmission system behaves in a similar way by operation of the auxiliary shift lever 43, and this aspect will not be described.

With the foregoing construction of the transmission system, speed changes take place between different shift positions. When a change is made from one shift position to another, the hydraulic clutch 3 is automatically disengaged as described above. It is necessary for the hydraulic clutch 3 to assume a half-clutch state in the course of shifting to the engaged position. An optimal shifting operation is achieved by controlling the clutching pressure of hydraulic clutch 3 in the half-clutch state.

Detailed description will be made hereinafter of the way in which the controller 42 controls the pressure control valve 21 acting as an actuator to control the clutch 3.

Figure 5:
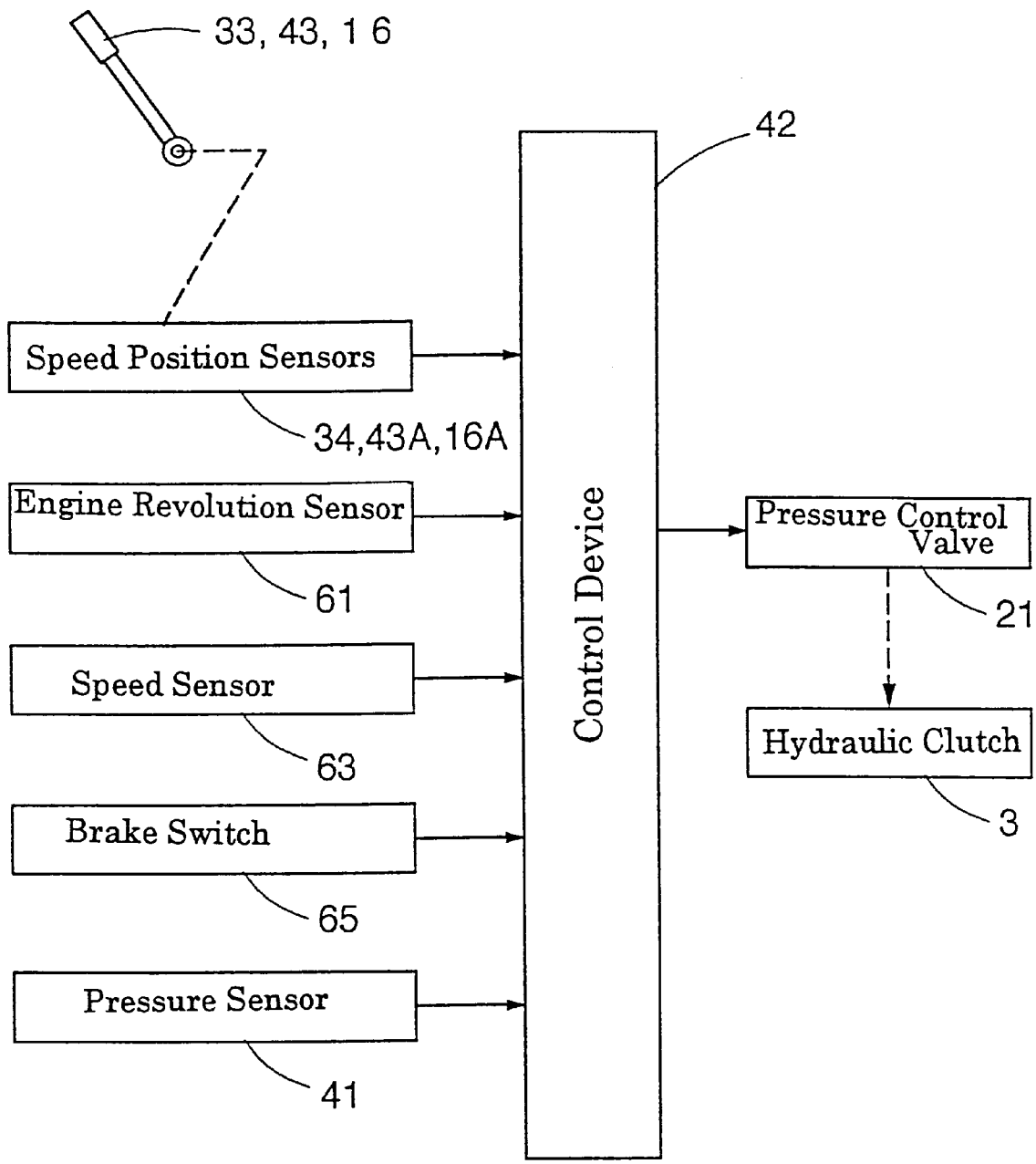
FIG. 5 is an explanatory view of different sensors for inputting signals to a controller, and output of the controller.

As shown in FIG. 5, the controller 42 receives output information from various sensors. Specifically, the controller 42 receives outputs of the potentiometer 34 and the switches 43A and 16A acting as speed position sensors for detecting shift positions of shift lever 33, auxiliary shift lever 43 and backward and forward drive changeover lever 16, output of the tachometer 61 acting as an engine rotation sensor, output of the speed sensor 63, output of the brake switch 65 for detecting operation of the brake pedal BP, and output of the pressure sensor 41 for measuring the pilot pressure. Based on at least part of the above information, the controller 42 controls the hydraulic clutch 3 through the pressure control valve 21.

A control algorithm performed by the controller 42 will be described next with reference to FIGS. 6 through 11. In (A) of FIGS. 6 to 11, the vertical axis represents speed of the working vehicle, and the horizontal axis time. Consequently, in these figures, the slopes of the curves show acceleration a. A theoretical running speed is derived from a rotating speed (rpm) of the engine which is outputted from the revolution speed sensor 61, and an output from the speed position sensor 34. This theoretical running speed is shown in dotted lines. An actual ground or running speed of the working vehicle outputted from the speed sensor 63 is shown in solid lines. There is a difference between the speed position, such as five, and the speed position of the vehicle itself, also referred to as the measured ground speed or the running speed. The measured ground speed or running speed of the vehicle may be different from a theoretical or desired running speed. Theoretical or desired running speed is calculated from both the target speed position and the rotating speed of the engine. For example, if the engine is running at a given rpm, the current speed position may be four. If an operator wishes to increase speed, the operator may elect to switch to speed position five. At the moment of the speed change operation, the running speed of the vehicle would not change suddenly, because shifting the clutch involves disengaging the clutch and re-engaging in the clutch in a way where there is no shock. The theoretical running speed of the vehicle is then calculated by the target speed position, which in this example is five, and the rate of engine rotation. The engine speed stays constant while the speed position is increased to 5. In this instance, the theoretical running speed of the vehicle is greater than the measured actual ground speed.

In (B) of FIGS. 6 to 11, the vertical axis represents pressure. Hydraulic pressure applied to the hydraulic clutch 3 is shown in solid lines. The horizontal axis represents time. In each of these figures, the time axis in (A) and the time axis in (13) correspond to each other.

Figure 6:
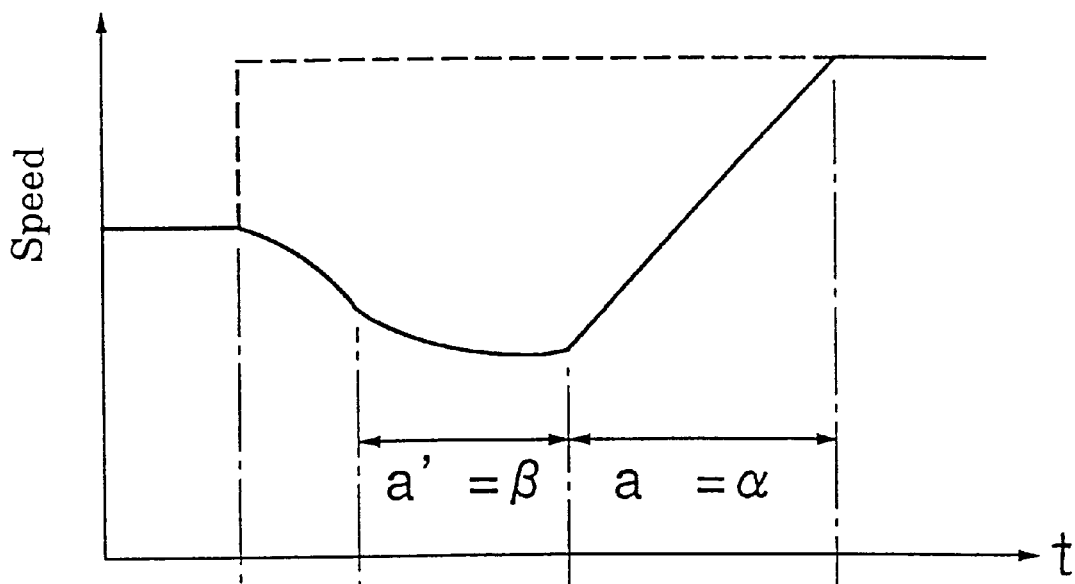
FIG. 6(A) is a view showing a control relating to a feedback control of a hydraulic clutch performed when, with the working vehicle in deceleration, a shift is made to a higher speed position.
FIG. 6(B) is a view showing a control hydraulic pressure applied to the hydraulic clutch as a result of the control shown in FIG. 6(A)
Figure 6:
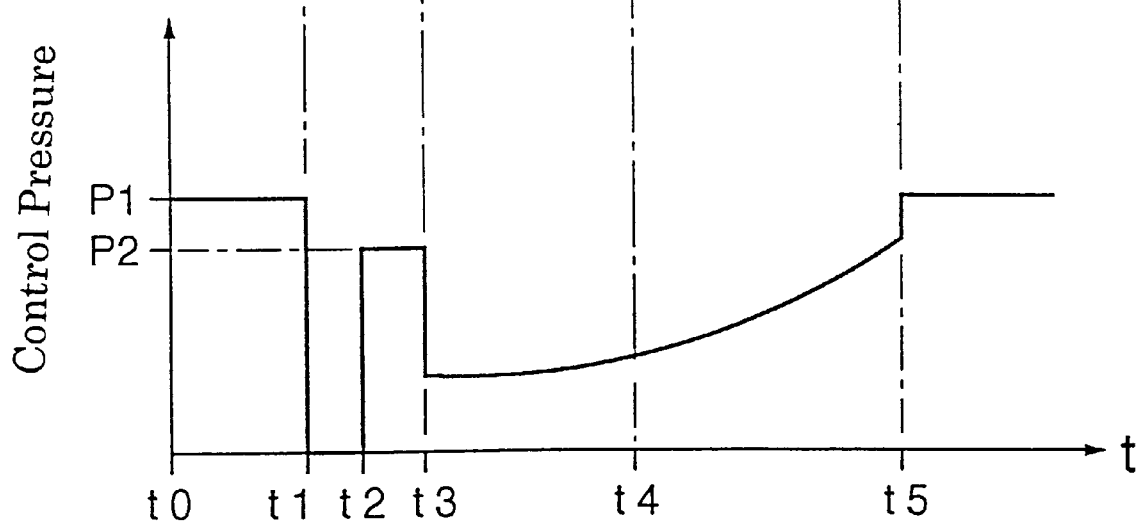
Figure 8A:
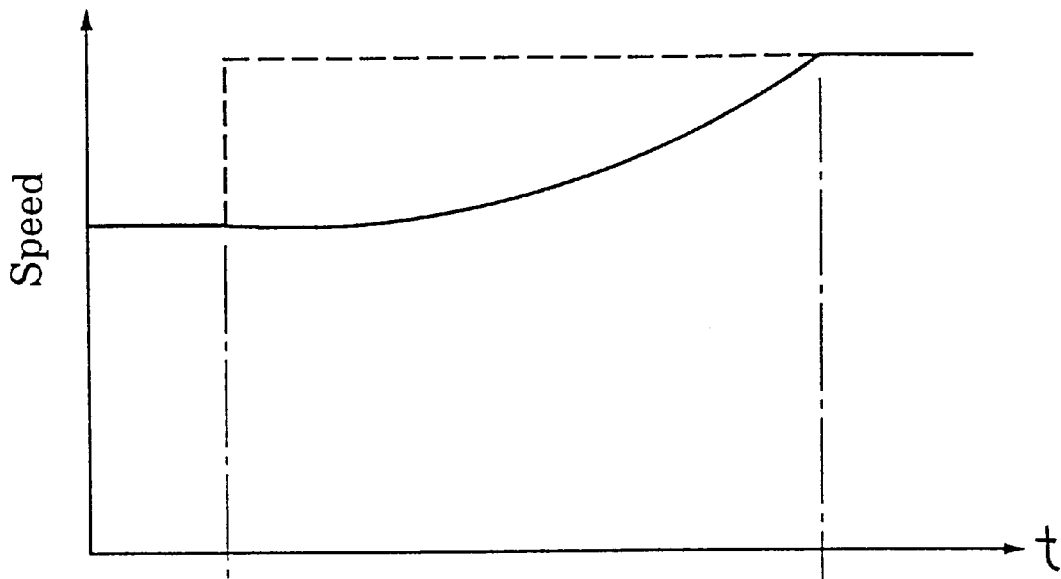
FIG. 8(A) is a view showing a control relating to the feedback control of the hydraulic clutch performed when, with the working vehicle in non-rapid acceleration, a shift is made to a higher speed position.
Figure 8B:
FIG. 8(B) is a view showing a control hydraulic pressure applied to the hydraulic clutch as a result of the control shown in FIG. 8(A)
Figure 9A:
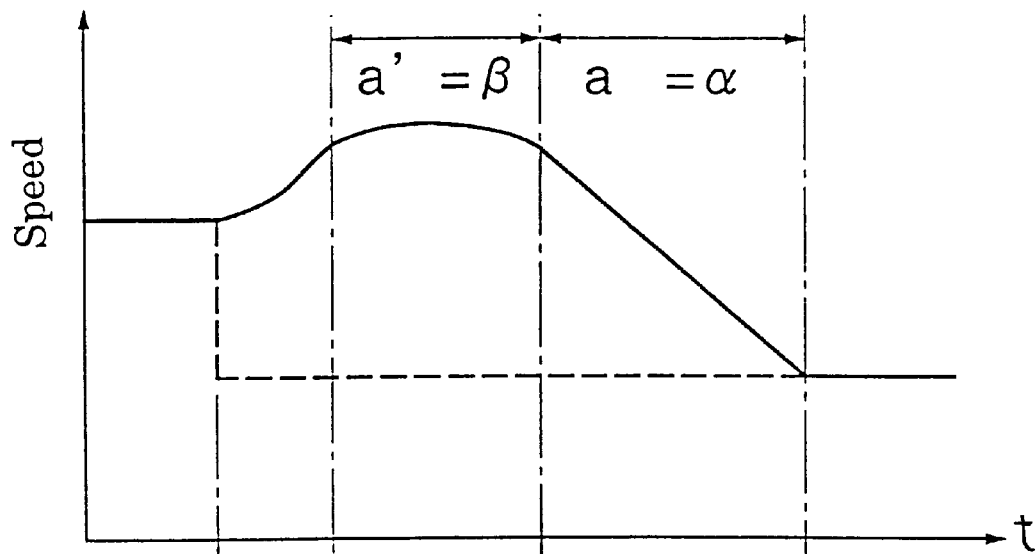
FIG. 9(A) is a view showing a control relating to the feedback control of the hydraulic clutch performed when, with the working vehicle in acceleration, a shift is made to a lower speed position.
Figure 9:
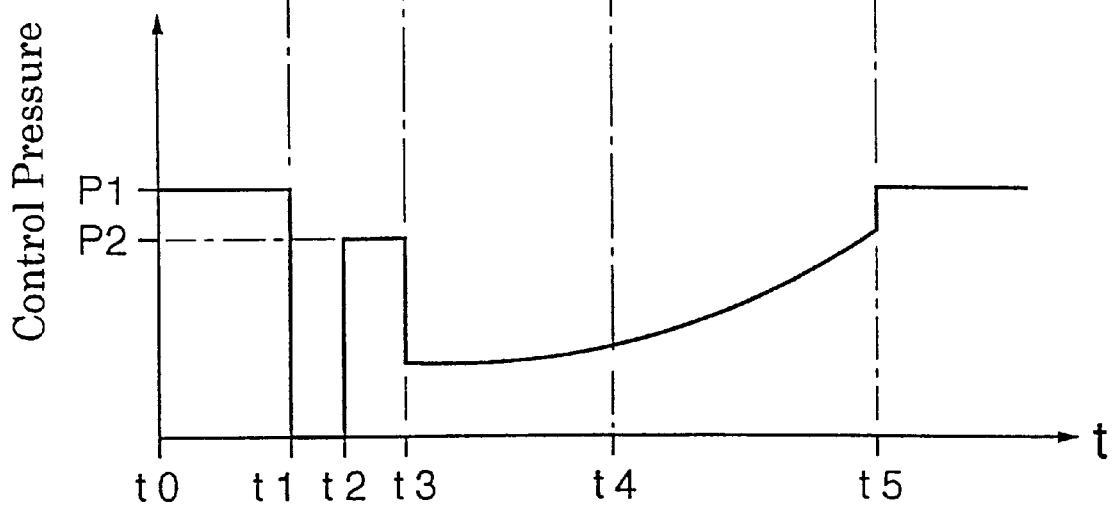
FIG. 9(B) is a view showing a control hydraulic pressure applied to the hydraulic clutch as a result of the control shown in FIG. 9(A)
Figure 10:
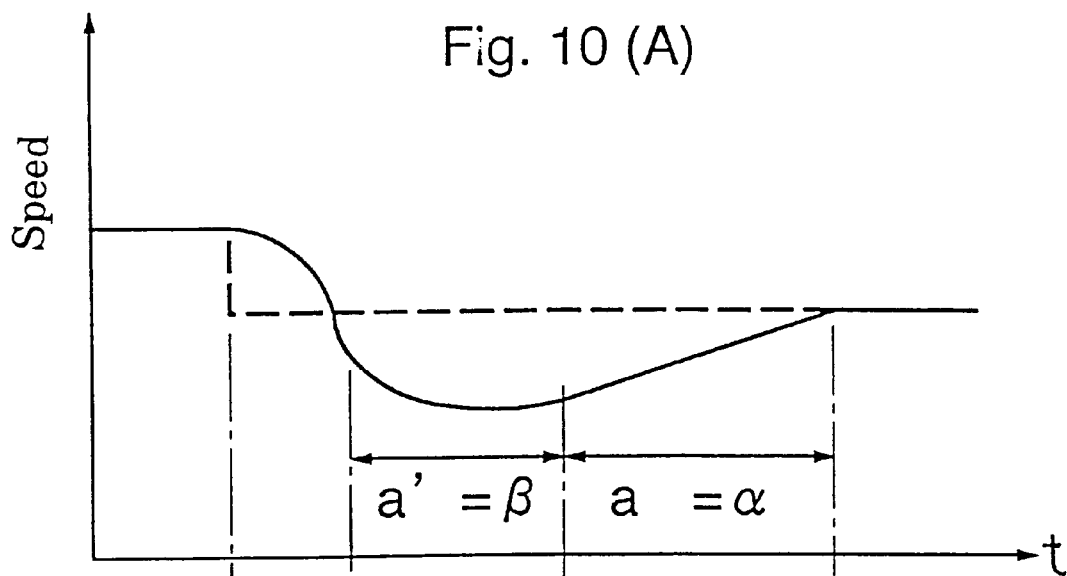
FIG. 10(A) is a view showing a control relating to the feedback control of the hydraulic clutch performed when, with the working vehicle in rapid deceleration, a shift is made to a lower speed position.
FIG. 10(B) is a view showing a control hydraulic pressure applied to the hydraulic clutch as a result of the control shown in FIG. 10(A)
Figure 10B:
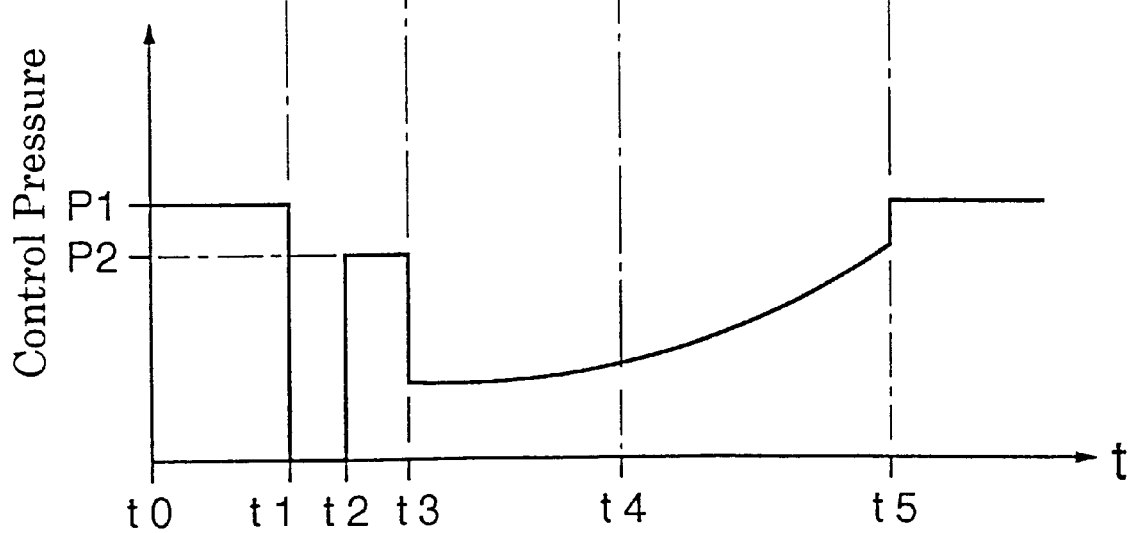

FIGS. 6 through 8 show controls for causing the working vehicle to run with a certain speed position selected from point of time to t0 point of time t1, and thereafter to run with a shift made to a higher speed position. FIGS. 9 through 11 show a case where a shift is made at point of time t1 from a current speed position to a lower speed position.

In FIG. 6, the driver operates the shift lever 33 to a shift position for the higher speed position at point of time t1. At this point of time, as described hereinbefore, the control valve 35 automatically reduces the hydraulic pressure to the hydraulic clutch 3 to zero. FIG. 6 shows a control in which, when the clutch 3 is disengaged, the working vehicle is not accelerated (acceleration a being zero or negative) as shown in the solid line in FIG. 6(A). At this time, a reduced output of the pressure sensor 41 notifies the controller 42 that the clutch 3 has been disengaged. The controller 42 then takes no action during a predetermined period from t1 to t2. At point of time t2, with the gears involved in the shifting operation having been shifted, the control valve 35 permits hydraulic pressure to be transmitted from the pressure control valve 21 to the clutch 3. The controller 42 controls the pressure control valve 21 to apply a predetermined hydraulic pressure P2 to the hydraulic clutch 3 to provide the half-clutch state just for a period from t2 to t3.

At point of time t3, the controller 42 derives variations in measured speed per unit time from the output of the speed sensor 63 inputted thereto continuously, thereby to compute an acceleration of the working vehicle. Further, the controller 42 computes variations with time of the acceleration to obtain a value commonly called jerk a' which is obtained by differentiating the acceleration with respect to time. The apostrophe (') accompanying "a" here indicates a differentiation with respect to time. The controller 42 compares jerk a' with a first set value $\beta$, and performs a feedback control of the hydraulic dutch 3 to equalize these values. The feedback control to obtain an acceleration characteristic for providing a fixed jerk as above is called herein a first control mode.

This $\beta$ has a positive value. With the above control performed, the measured acceleration a of the working vehicle shown in the solid line changes from negative to positive. In other words, when the theoretical running speed which is represented by the curves in FIGS. 6(A) to 11(A), is greater than the measured speed and when the measured speed is decreasing, the jerk value is regulated to be positive so as to shift the measured speed toward the theoretical running speed. When the measured acceleration reaches a second set value $\alpha$ at point of time t4, a feedback control is performed for the hydraulic clutch 3 to keep the measured acceleration at the second set value $\alpha$. The feedback control to obtain an acceleration characteristic for providing a fixed acceleration as above is called herein a second control mode.

This control is continued until point of time t5 when the measured speed agrees with the theoretical running speed. The period of time (from t3 to t4) for controlling the jerk to become the first set value β is called a first time domain. The period of time (from t4 to t5) for controlling the measured acceleration a' to become the second set value α is called a second time domain.

When the measured speed agrees with the theoretical running speed, the controller 42 immediately increases the hydraulic pressure to the hydraulic clutch 3 to a predetermined hydraulic pressure P1 for fully engaging the hydraulic clutch 3.

FIG. 7 shows a control performed when, with the clutch 3 placed in the half-clutch state at point of time t3 after being disengaged for a shifting operation, the acceleration a is positive, and the measured speed already exceeds the theoretical running speed. When the measured speed is increasing rapidly as above, the controller 42 at point of time t3 starts controlling the jerk a' to become a first set value −β(β>0) in this state (the first control mode). In other words, when the theoretical running speed is less than the measured speed, and when the measured speed is increasing, the jerk value is regulated to be negative to shift the measured speed toward the theoretical running speed. In this case, the actual speed of the working vehicle exceeds the theoretical running speed based on the speed rotation and a target clutch state. An increase in the pressure of hydraulic clutch 3 results in an engine brake to decelerate the working vehicle.

In this way, a control is effected to lower the speed curve of the working vehicle having overshot the desired theoretical running speed, toward the theoretical running speed. Moreover, it is possible to avoid a shock generated when the dutch pressure is raised to P1 all at once. Further, when the measured acceleration a reaches a second set value −α at point of time t4, the controller 42 controls the measured acceleration to remain the second set value −α (the second control mode).

When the measured speed agrees with the theoretical running speed at point of time t5, the controller 42 immediately increases the hydraulic pressure to the hydraulic clutch 3 to the predetermined hydraulic pressure P1 for fully engaging the hydraulic clutch 3.

FIG. 8 shows a control performed when, with the hydraulic clutch 3 placed in the half-clutch state at point of time t3 after being automatically disengaged for a shifting operation, the measured speed is in a state of acceleration but does not exceed the theoretical running speed.

The working vehicle is allowed to reach naturally the theoretical running speed at point of time t5 by reducing the control pressure to the hydraulic dutch 3 to a predetermined pressure P3 substantially lower than the pressure P2 to maintain the clutch 3 in a light half-clutch state. When the measured speed agrees with the theoretical running speed at point of time t5, the controller 42 immediately increases the hydraulic pressure to the hydraulic clutch 3 to the predetermined hydraulic pressure P1.

In this case, when the acceleration of the working vehicle is slack and the measured speed fails to reach the theoretical running speed within a predetermined time, the controller 42 increases the hydraulic pressure to the hydraulic clutch 3 to the predetermined hydraulic pressure P1. When the measured speed fails to reach the theoretical running speed within the predetermined time, the acceleration a may be controlled to be the predetermined acceleration α.

FIG. 9 shows variations of different parameters occurring when a shift is made to a lower speed position at point of time t1, and the working vehicle is not in deceleration (acceleration being zero or positive) at point of time t3.

When the hydraulic clutch 3 is placed in a half-clutch state at point of time t3, the controller 42 performs a feedback control of the hydraulic clutch 3 for controlling the jerk a' to become the first set value −β (the first control mode). At point of time t4 when acceleration a becomes −α, the second control mode is started to control the actual acceleration of the working vehicle to become the second predetermined value −α. The second control mode is continued until the measured speed agrees with the theoretical running speed at point of time t5. When the measured speed agrees with the theoretical running speed, the controller 42 immediately increases the hydraulic pressure to the hydraulic clutch 3 to the predetermined hydraulic pressure P1.

FIG. 10 shows a control performed when, at point of time t3 following a shifting operation, acceleration is negative, and the measured speed is already below the theoretical running speed. In this case, the controller 42 at point of time t3 starts controlling the jerk a' to become a first set value β in this state (the first control mode). In this way, a control is effected to raise the speed curve of the working vehicle having overshot the desired theoretical running speed, toward the theoretical running speed. Moreover, it is possible to avoid a shock generated when the clutch pressure is raised to P1 all at once. Further, when the measured acceleration a reaches the second set value α at point of time t4, the controller 42 controls the measured acceleration to remain the second set value α (the second control mode).

When the measured speed agrees with the theoretical running speed, the controller 42 immediately increases the hydraulic pressure to the hydraulic clutch 3 to the predetermined hydraulic pressure P1.

FIG. 11 shows a control performed when, with the hydraulic clutch 3 placed in the half-clutch state at point of time t3 after a shifting operation, the measured speed is in a state of deceleration but not below the theoretical running speed.

In this case, the working vehicle is allowed to reach naturally the theoretical running speed at point of time t5 by reducing the control pressure to the hydraulic clutch 3 to the predetermined pressure P3 lower than the pressure P2 to maintain the clutch 3 substantially in a light half-clutch state. When the measured speed agrees with the theoretical running speed at point of time t5, the controller 42 immediately increases the hydraulic pressure to the hydraulic clutch 3 to the predetermined hydraulic pressure P1.

In this case, when the speed of the working vehicle fails to reach the theoretical running speed naturally within a predetermined time, the controller 42 increases the hydraulic pressure to the hydraulic clutch 3 to the predetermined hydraulic pressure P1 to avoid an extended shifting time. When the measured speed fails to reach the theoretical running speed within the predetermined time, the acceleration a may be controlled to be the predetermined acceleration α.

In the above description, where, for example, a feedback control is performed so that acceleration a computed from measured speeds becomes equal to the set value α, it is possible to control acceleration a to be precisely equal to the target value α. However, it is preferable to provide a deadband delta for the target value α, such that acceleration a is controlled to be within α±δ.

Figure 12:
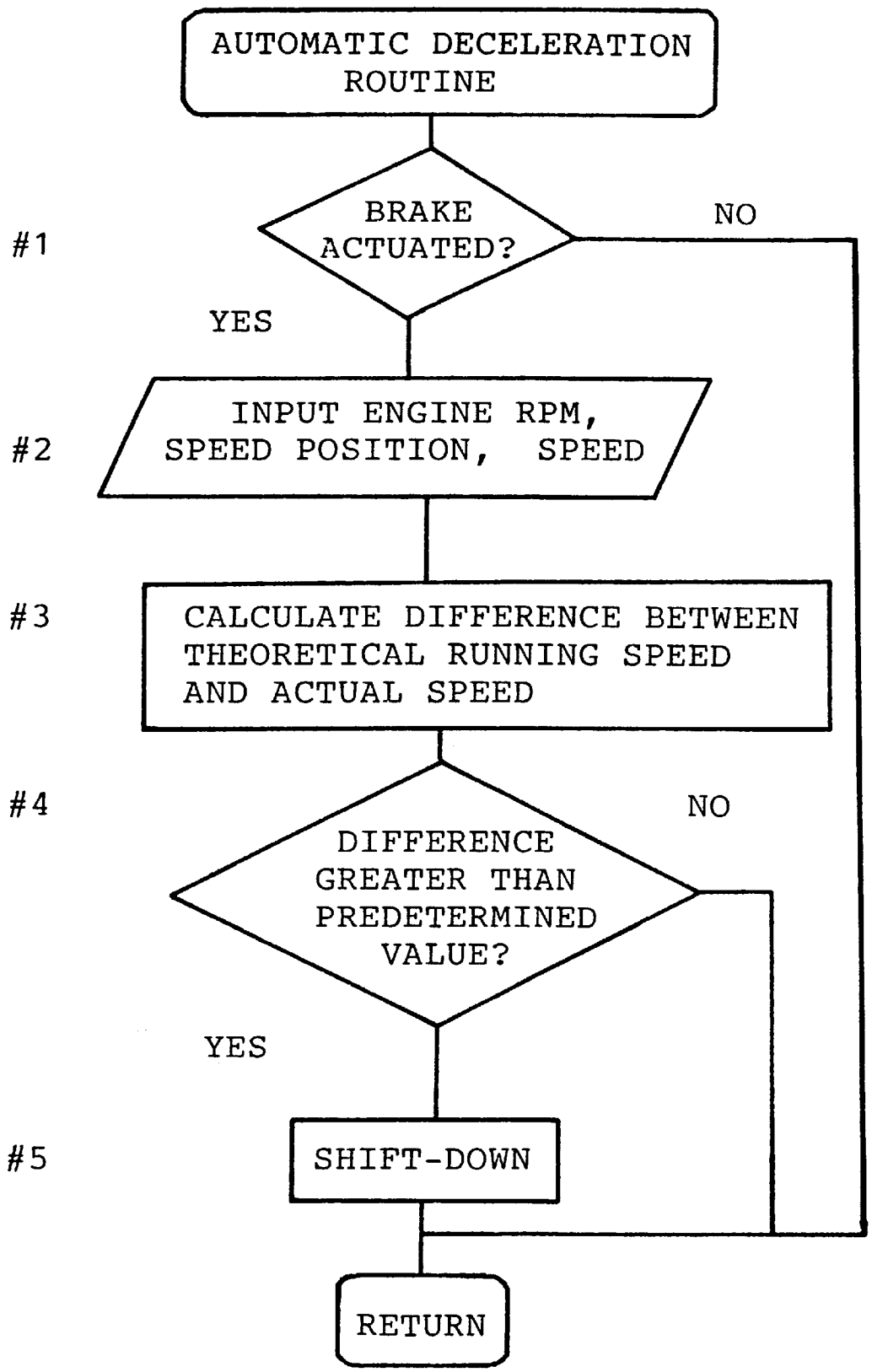
FIG. 12 is a flow chart of a control routine for automatically downshifting the vehicle when the vehicle is braked deliberately.

The controller 42 is operable to automatically decelerate the transmission system for acting on the traveling system when the driver deliberately depresses the brake pedal BP to effect deceleration. That is, as shown in the flow chart of FIG. 12, when a signal received from the brake switch 65 indicates that the brakes have been applied, the controller 42 takes in information on the rotating speed of engine 1, speed positions of the change speed devices and measured speed of the working vehicle from the revolution speed sensor 61, speed position sensor 34 and speed sensor 63, respectively, and compares the actual speed with the theoretical running speed derived from the rotating speed of engine 1 and speed positions of the change speed devices. When the actual speed is found below a predetermined value, the controller 42 controls a change speed motor not shown to effect a downshift operation (steps #1 to #5).

With this change speed system, running speed may be changed simply and automatically by operating the shift lever 33 to a desired speed position without depressing the clutch pedal 17. The hydraulic clutch 3 is engageable smoothly without generating shocks, with an optimal pressure characteristic based on the theoretical running speed and actual speed. Particularly when the vehicle is accelerated rapidly as a result of a shifting operation, the acceleration is corrected with fixed jerk a'. Thus, a desired speed is achieved without generating shocks.

In the foregoing embodiment, the controller 42 perceives a shifting operation having been carried out from a decrease in the output of hydraulic sensor 41 which measures the pilot pressure. Instead, the controller 42 may determine from an operation of shift lever 33 that a shifting operation has been candied out.

In the embodiment, the hydraulic clutch 3 is automatically disengaged by the control valve 35 and the like in response to a shifting operation. Instead, disengagement of hydraulic clutch 3 also may be effected by the controller 42 in response to a shifting operation.

The pressure control valve 21, instead of being the electromagnetic proportional type, may be the type having an electromagnetic solenoid to perform PWM control.

In the foregoing embodiment, as shown in FIG. 7, for example, jerk a' is controlled to be $-\beta$ at point of time t3 when the measured speed of the working vehicle exceeds the theoretical running speed. Instead, when acceleration a exceeds a third set value $\gamma$ larger than the second set value $\alpha$, even if the measured speed does not exceed the theoretical running speed at point of time t3, the control hydraulic pressure to the hydraulic clutch 3 may not be increased to P1, thereby allowing the measured speed to exceed the theoretical running speed. Thereafter, jerk a' may be controlled in the first control mode to become $-\beta$. Subsequently, the second control mode is performed until the measured speed becomes the theoretical running speed. In this case, when acceleration a of the working vehicle is below the third set value $\gamma$, the control described with reference to FIG. 8 is performed.

It is obvious to a person of ordinary skill in the art that a similar control is applicable to what is illustrated in FIGS. 10 and 11.

The control pressure of hydraulic clutch 3 according to this invention described in the above embodiment is a function having, as inputs, the outputs of the speed position sensor 34, engine revolution speed sensor 61 and speed sensor 63. The feedback control may be based on acceleration and jerk as in the foregoing embodiment. However, the feedback control may be based on a difference between the theoretical running speed and measured speed. The following control may be performed, for example. When a shifting operation is carried out to attain a higher speed, the hydraulic pressure to the hydraulic clutch 3 is increased the more rapidly the larger the speed difference is. When a shifting operation is carried out to attain a lower speed, the hydraulic pressure to the hydraulic clutch 3 is increased the more gradually the larger the speed difference is.

This invention relates to shifting operations of a working vehicle, and particularly to characteristics of control hydraulic pressure applied to the hydraulic clutch 3. The invention is not limited to the transmission system of the working vehicle disclosed in the foregoing embodiment and modifications thereof. In particular, this invention may be applied, within the scope thereof, to a working vehicle not having the first auxiliary change speed device C or the second auxiliary change speed device D.

What is claimed is:

1. A working vehicle having an engine, a traveling device, and a transmission disposed between the engine and the traveling device, comprising:

a clutch disposed between said engine and said traveling device, said clutch being switchable among a state for breaking drive transmission from said engine to said traveling device, a half-clutch state, and a state for making said drive transmission;

an actuator for controlling said clutch;

a speed sensor for obtaining a measured ground speed of said working vehicle; and control means for deriving a measured acceleration from an output of said speed sensor, for computing a jerk value by differentiating said measured acceleration with respect to time and for performing a feedback control of said actuator to bring said jerk value into agreement with a predetermined acceleration characteristic which has non-zero jerk values during a first temporal domain.

2. A working vehicle as defined in claim 1 further comprising a revolution speed sensor for measuring a rotating speed of said engine, and a speed position sensor for measuring a target speed position, said control means being operable for computing a theoretical running speed, which is a desired running speed, from outputs of said revolution speed sensor and said speed position sensor, wherein said predetermined acceleration characteristic includes a time domain where said jerk is regulated to be positive when said theoretical running speed is greater than the measured ground speed and when the measured ground speed is decreasing and where said jerk is regulated to be negative when the theoretical running speed is less than said measured ground speed and when the measured ground speed is increasing.

3. A working vehicle as defined in claim 1, wherein the jerk value in said acceleration characteristic during said first time domain has a first non-zero constant value.

4. A working vehicle as defined in claim 5, wherein said acceleration characteristic includes a second time domain where said acceleration is a second constant value.

5. A working vehicle as defined in claim 4, wherein said second time domain follows said first time domain.

6. A working vehicle as defined in claim 5, wherein said first time domain ends and said second time domain begins when said measured acceleration becomes equal to said second constant value.

7. A working vehicle as defined in claim 6, wherein said control means is operable for computing said measured ground speed from the output of said speed sensor, and said actuator is operable, in said second time domain, when a theoretical running speed reaches said measured ground speed, to switch said clutch immediately from said half-clutch to said state for making said drive transmission.

8. A working vehicle as defined in claim 1, wherein said clutch is a hydraulic clutch, said actuator being operable for controlling a hydraulic pressure supplied to said hydraulic clutch.

9. A method of controlling a clutch of a working vehicle having an engine, a traveling device, a transmission disposed between the engine and the traveling device, and an actuator for controlling the clutch, the clutch being disposed between the engine and the traveling device to be switchable among a state for breaking drive transmission from the engine to the traveling device, a half-clutch state, and a state for making the drive transmission, said method comprising the steps of:

measuring a ground speed of said working vehicle;

deriving a measured acceleration from said ground speed;

computing a jerk value by differentiating said measured acceleration with respect to time;

comparing said jerk value and a predetermined acceleration characteristic; and performing a feedback control of said actuator, based on said comparison, to bring said jerk value into agreement with said predetermined acceleration characteristic which has non-zero jerk values during a first temporal domain.

10. A method as defined in claim 9, wherein the jerk value in said acceleration characteristic during said first time domain has a first non-zero constant value.

11. A method as defined in claim 10, wherein said acceleration characteristic includes a second time domain where said acceleration is a second constant value.

12. A method as defined in claim 11, wherein said second time domain follows said first time domain.

13. A method as defined in claim 12, wherein said first time domain ends and said second time domain begins when said measured acceleration becomes equal to said second constant value.

14. A method as defined in claim 9, further comprising the steps of computing a measured speed from the output of said speed sensor, and operating said actuator, when a theoretical running speed reaches said measured ground speed, to switch said clutch immediately from said half-clutch to said state for making said drive transmission.

15. A control apparatus for controlling a clutch of a working vehicle having an engine, a traveling device, a transmission disposed between the engine and the traveling device, and an actuator for controlling the clutch, the clutch being disposed between the engine and the traveling device to be switchable among a state for breaking drive transmission from the engine to the traveling device, a half-clutch state, and a state for making the drive transmission, said apparatus comprising:

means for measuring a ground speed of said working vehicle;

means for deriving a measured acceleration from said ground speed;

means for computing a jerk value by differentiating said measured acceleration with respect to time;

means for comparing said jerk value and a predetermined acceleration characteristic; and means for performing a feedback control of said actuator, based on said comparison, to bring said jerk value into agreement with a predetermined acceleration characteristic which has non-zero jerk values during a first temporal domain.

16. A working vehicle having an engine, a traveling device, and a transmission disposed between the engine and the traveling device, comprising:

a clutch disposed between said engine and said traveling device, said clutch being switchable among a state for breaking drive transmission from said engine to said traveling device, a half-clutch state, and a state for making said drive transmission;

an actuator for controlling said clutch;

a speed sensor for measuring a ground speed of said working vehicle;

a revolution speed sensor for measuring a rotating speed of said engine;

speed position sensor for measuring a target speed position; and control means for computing a theoretical running speed, which is a desired running speed, from outputs of said revolution speed sensor and said speed position sensor, computing a measured ground speed from the output of said speed sensor, and controlling said actuator to bring said measured ground speed close to said theoretical running speed.

17. A working vehicle as defined in claim 16, wherein said control means is operable for performing controls having different characteristics when a target shift position is for a higher speed than a current shift position, and when said target shift position is for a lower speed than said current shift position.

* * * * *